United States Patent
Gosetti et al.

(10) Patent No.: US 6,290,797 B1
(45) Date of Patent: Sep. 18, 2001

(54) PROCESS FOR MAKING MULTI-LAYER CORE GOLF BALLS

(75) Inventors: Steven M. Gosetti, Providence, RI (US); Douglas Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/283,965

(22) Filed: Apr. 2, 1999

(51) Int. Cl.⁷ .................................................. A63B 37/00
(52) U.S. Cl. ...................... 156/228; 156/245; 156/292; 156/311; 264/248; 264/255; 264/327
(58) Field of Search ............................. 156/146, 228, 156/245, 288, 292, 233, 303.1, 273.3, 273.5, 311; 473/371, 374; 264/271.1, 279.1, 248, 250, 255, 266–268, 322, 325, 327

(56) References Cited

U.S. PATENT DOCUMENTS

| Re. 35,293 | 7/1996 | Hiraoka et al. | 473/372 |
|---|---|---|---|
| 1,400,146 * | 12/1921 | Eggers et al. | 156/292 |
| 1,575,388 * | 3/1926 | Roberts | 156/245 |
| 2,292,396 | 8/1942 | Olin et al. | 18/53 |
| 2,354,017 | 7/1944 | Hazell | 154/18 |
| 3,362,937 | 1/1968 | Kent | 260/79.5 |
| 3,502,338 | 3/1970 | Cox | 273/218 |
| 3,666,272 | 5/1972 | Walker et al. | 273/218 |
| 3,671,477 * | 6/1972 | Nesbitt | 473/371 |
| 3,784,209 | 1/1974 | Berman et al. | 273/218 |
| 3,883,145 | 5/1975 | Cox et al. | 273/218 |
| 3,933,967 * | 1/1976 | Taylor | 156/245 |
| 3,979,126 | 9/1976 | Dusbiber | 273/218 |
| 3,981,943 | 9/1976 | Fujio et al. | 260/880 R |
| 3,989,568 | 11/1976 | Issac | 156/182 |
| 4,065,537 | 12/1977 | Miller et al. | 264/143 |
| 4,123,061 | 10/1978 | Dusbiber | 273/220 |
| 4,169,599 | 10/1979 | Fujio et al. | 273/220 |
| 4,229,401 | 10/1980 | Pocklington | 264/248 |
| 4,266,772 | 5/1981 | Martin et al. | 273/218 |
| 4,546,980 | 10/1985 | Gendreau et al. | 273/218 |
| 4,625,964 | 12/1986 | Yamada | 273/62 |
| 4,650,193 | 3/1987 | Molitor et al. | 273/228 |

(List continued on next page.)

FOREIGN PATENT DOCUMENTS

| A-28623/97 | 1/1996 | (AU) . |
|---|---|---|
| 29 35 603 A1 | 3/1981 | (DE) . |
| 1087901 | 10/1967 | (GB) . |
| 2 299 518 A | 10/1996 | (GB) . |
| 2 300 574 A | 11/1996 | (GB) . |
| 2 302 035 A | 1/1997 | (GB) . |
| 2 302 037 A | 1/1997 | (GB) . |
| 51-49840 | 4/1976 | (JP) . |
| 60-241463 | 11/1985 | (JP) . |
| 64-80377 | 3/1989 | (JP) . |

*Primary Examiner*—Geoffrey L. Knable
(74) *Attorney, Agent, or Firm*—Pennie & Edmonds LLP

(57) ABSTRACT

The invention provides a process for manufacturing a golf ball, particularly a multi-layer golf ball. The process comprises forming a pre-molded center, molding two substantially hemispherical shells having substantially hemi spherical cavities, shaping the shells in a press having a top mold and a bottom mold, each with cavities concaving toward each other and a center plate having top and bottom protrusions. The shells are placed in the cavities of the bottom mold and the protrusions of the center plate. The three parts of the press are aligned and closed as the press is heated to a temperature below the cure activation temperature of the shell material. The center plate is then removed from the press with the shells in the cavities of the top and bottom mold. as ball center is inserted between the shells and the press is again closed and heated to a second temperature, above the cure activation temperature, fusing the shells around the center and forming a golf ball core. A cover is thereafter formed over the core either through compression or injection molding.

8 Claims, 12 Drawing Sheets

U.S. PATENT DOCUMENTS

| | | | |
|---|---|---|---|
| 4,653,758 | 3/1987 | Solheim | 273/232 |
| 4,692,497 | 9/1987 | Gendreau et al. | 525/263 |
| 4,714,253 | 12/1987 | Nakahara et al. | 273/228 |
| 4,781,383 | 11/1988 | Kamada et al. | 273/228 |
| 4,848,770 | 7/1989 | Shama | 273/228 |
| 4,852,884 | 8/1989 | Sullivan | 273/230 |
| 4,863,167 | 9/1989 | Matsuki et al. | 273/62 |
| 4,882,387 | 11/1989 | Tobing | 525/194 |
| 4,919,434 | 4/1990 | Saito | 273/235 R |
| 4,979,746 | 12/1990 | Gentiluomo | 273/220 |
| 5,002,281 | 3/1991 | Nakahara et al. | 273/220 |
| 5,006,297 | 4/1991 | Brown et al. | 264/234 |
| 5,019,319 | 5/1991 | Nakamura et al. | 273/218 |
| 5,026,067 | 6/1991 | Gentiluomo | 273/220 |
| 5,048,838 | 9/1991 | Chikaraishi et al. | 273/228 |
| 5,062,912 | 11/1991 | Hoffman | 156/145 |
| 5,072,944 | 12/1991 | Nakahara et al. | 273/220 |
| 5,116,060 | 5/1992 | Sullivan et al. | 273/218 |
| 5,150,905 | 9/1992 | Yuki et al. | 273/218 |
| 5,184,828 | 2/1993 | Kim et al. | 273/228 |
| 5,253,871 | 10/1993 | Viollaz | 273/228 |
| 5,314,187 | 5/1994 | Proudfit | 273/235 R |
| 5,403,010 | 4/1995 | Yabuki et al. | 273/220 |
| 5,407,998 | 4/1995 | Horiuchi et al. | 525/133 |
| 5,439,227 | 8/1995 | Egashira et al. | 273/228 |
| 5,482,285 | 1/1996 | Yabuki et al. | 273/228 |
| 5,490,674 | 2/1996 | Hamada et al. | 273/228 |
| 5,516,110 | 5/1996 | Yabuki et al. | 473/372 |
| 5,553,852 | 9/1996 | Higuchi et al. | 473/373 |
| 5,556,098 | 9/1996 | Higuchi et al. | 473/373 |
| 5,559,188 | 9/1996 | Egashira et al. | 525/74 |
| 5,562,287 | 10/1996 | Endo et al. | 273/377 |
| 5,586,950 | 12/1996 | Endo | 473/356 |
| 5,589,546 | 12/1996 | Hiraoka et al. | 525/193 |
| 5,601,502 | 2/1997 | Hiraoka et al. | 473/373 |
| 5,605,512 | 2/1997 | Yamada et al. | 473/354 |
| 5,681,898 | 10/1997 | Pocklington | 525/193 |
| 5,683,312 | 11/1997 | Boehm et al. | 473/354 |
| 5,688,191 | 11/1997 | Cavallaro et al. | 473/373 |
| 5,688,595 | 11/1997 | Yamagishi et al. | 428/375 |
| 6,036,907 * | 3/2000 | Tanaka et al. | 264/279.1 |
| 6,096,255 * | 8/2000 | Brown et al. | 264/248 |

* cited by examiner

PROCESS FOR MAKING MULTI-LAYER CORE GOLF BALLS

FIELD OF INVENTION

This invention relates generally to a process for manufacturing golf balls, and more particularly, golf balls comprising multi-layer core.

BACKGROUND OF THE INVENTION

Generally, golf balls have been classified as two-piece balls, wound (or three-piece) balls, and balls with multi-layer cores and/or multi-layer covers wound balls or solid balls. The prior art comprises a variety of golf balls that have been designed to provide particular playing characteristics. These characteristics are generally the initial velocity and spin of the golf ball, which can be optimized for various types of players. For instance, certain players prefer a ball that has a high spin rate in order to control and stop the golf ball. Other players prefer a ball that has a low spin rave and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but are hard feeling and difficult to control around the greens.

Two-piece golf balls are generally most popular with the average recreational golfer because these balls provide durability while allowing greater distance. These balls contain a solid core, typically made of crosslinked polybutadiene, and a cover, typically made of a tough, cut-proof ionomer resin, such as SURYLN® (DuPont). The combination of the materials used to construct the core and cover provides a ball that is virtually indestructible by golfers. Further, such combination imparts a high initial velocity to the ball, which results in improved distance during play. The rigidity of the materials used also provides two-piece golf balls with a harder "feel" when struck with a club and results in relatively a low spin rate which maximizes travel distance. However, greater distance is achieved at the expense of decreasing control, particularly on shorter approach shots.

The simple structure of the two-piece golf balls renders these balls relatively easy to manufacture by using well-known, conventional methods. Generally, a polybutadiene rubber composition is mixed and formed into preparatory materials ("preps"). These preps are then inserted into a compression mold to form spherical cores. Thereafter, a cover is injection molded or compression molded over the cores to form the finished golf balls.

Three-piece golf balls, or wound balls, are the preferred balls for more advanced players and are generally thought of as performance golf balls. Wound balls are more resilient and are associated with greater spin characteristics and softer feel when struck by a golf club. Wound balls are generally constructed fiom a liquid or solid centers surrounded by tensioned elastomeric material. The wound core is then covered with a durable cover material, such as SURLYN® or a similar material, or a softer cover such as Balata or polyurethane. Wound balls have a generally softer "feel" and provide more spin during travel, which enables a skilled golter to have more control over the ball's flight and final position. However, wound, higher-spinininig balls typically provide a shorter distance compared to two-piece balls. Moreover, as a result of their more complex structure, wound balls generally require more time and expense to manufacture than two-piece balls.

In an effort to maximize the benefits of two-piece balls and wound balls, golf ball manufacturers have been modifying the properties of conventional non-wound balls by altering the typical single layer core and single layer cover construction to provide a multi-layer ball. These multi-layer cores provide new and improved characteristics to the resulting golf balls. However, they introduce new demands on the manufacturing process. In making solid balls manufacturers have molded layers around a solid center by placing a pre-formed center between two blocks of core material in a spherical compression mold. This process, however, provides minimal control over the ultimate placement of the center within the golf ball and often results in large variations in the alignment of the center of the core with respect to the center of the golf ball.

There are prior art patents directed to improved manufacturing processes for making golf balls. For example, U.S. Pat. No. 5,006,297 discloses a method in which partially cured polyurethane half-shells are formed around a center in a fixed-pin mold. The half-shells and the center are intermediately cured and compression molded thereafter to form a finished golf ball. This method, however, is Generally inapplicable to forming multi-layer cores of different formulations. U.S. Pat. No. 5,314,187 discloses another method for golf ball manufacture in which an inner cover layer is molded around a core, either by injection molding around the core or by injection molding twvo half shells, and compression molding the cover layer around the core. U.S. Pat. No. 5,586,950 discloses a similar method. However, these patents are directed to inner cover layers constructed of thermoplastic materials.

The prior art also includes a method for the manufacture of double cover golf balls. This is generally accomplished by injection molding a first and then a second cover layer around a core. This system, however, requires complex injection molds, usually with retractable pins within the mold to properly position the core. Moreover, this system is better suited for thermoplastic materials.

Multiple outer layers are conventionally formed around a golf ball center by a variety of methods, including compression molding or injection molding a spherical shell layer around the center. Each of these manufacturing methods suffers from several disadvantages. Injection molding of the shells around the golf ball center is expensive, due to the higher capital costs associated with the more complex manufacturing process. In addition, injection molding can introduce defects into the core due to the penetration by the pins. Moreover, injection molding does not generally work well with thermoset materials. An alternative method was developed wherein hemispherical shells are formed first and are thereafter compression molded around a golf ball center to avoid pin defects. This method generally works well with thermoplastic materials. However, this method is not generally contemplated with thermoset materials, which lack sufficient rigidity to hold a formed shape before being cured and cannot be reformed after being cured. Thus, the multi-layer cores formed today generally have poor concentricity between the center and outer layers, which adversely affects playing characteristics. In addition, the prior art fails to provide a processes which can improve the properties of multi-layer cores using a variety of core formulations.

Thus, there remains a need for a method directed to improving the manufacturing processes used for making multi-layer cores that is adaptable for a variety of golf ball core formulations and produces golf ball cores with improved centering characteristics.

SUMMARY OF THE INVENTION

The present invention is directed to a process for making golf balls having a multi-layer core with a solid or fluid filled center. The process comprises forming substantially hemispherical shells from elastomeric material. preferably polybutadiene, and molding the half-shells around a center to form a multi-layer golf ball core. The golf balls formed according to the present invention are significantly more concentric than prior art golf balls having multiple core layers. The golf balls as set forth herein also have excellent playing characteristics such as resiliency, spin rates and feel.

In one embodiment of the present invention. shells are pre-formed with hemispherical cavities produced by a protrusion of a mold part. Thereafter, the shells are placed in a press having a top mold, a center plate and a bottom mold. The top and bottom molds have substantially hemispherical cavities, which concave toward each other. The center plate has substantially hemispherical upper and lower protrusions aligned to cooperate with the cavities of the top and bottom molds. The shells are placed in the hemispherical cavities of the lower mold and on the upper protrusions of the center plate such that when the press is closed during operation, the upper and lower protrusions of the center plate is in alignment with the cavities of the upper and lower molds. After process the shells for a pre-determined period of time, the press is opened and the shells are retained in the cavities of the top and bottom molds. The center plate is removed, and a ball center is inserted into cavity of the shells positioned in the lower mold. The press is again closed again to mold the shells around the center.

When the shells are combined with the center in the substantially spherical cavity shaped by the shells, the shells form the outer layer of the core. Thus, the center is concentrically positioned within the finished core. Finally, a cover is molded around the core. This process results in accurate and repeatable central placement of the center within the core.

The present invention also includes an improved press construction for forming multi-layer golf ball cores. Preferably, the press comprises a frame, a lower mold with substantially hemispherical mold cavities, an upper mold with corresponding hemispherical mold cavities and a center plate with corresponding hemispherical protrusions alignable with the cavities of the lower and upper molds. The lower and upper molds are secured to the frame of the press, and the center plate is separately secured to the frame such that it is slidable in and out of the press. In this manner, the press can be operated without removing the molds from the press.

Another embodiment of the improved mold construction includes installing cooling flow channels in the mold to improve the molds' thermal response rate and to accelerate the rate of thermal contraction of the shells.

DESCRIPTION OF THE PREFERRED EMBODIMENTS

Figure 1:
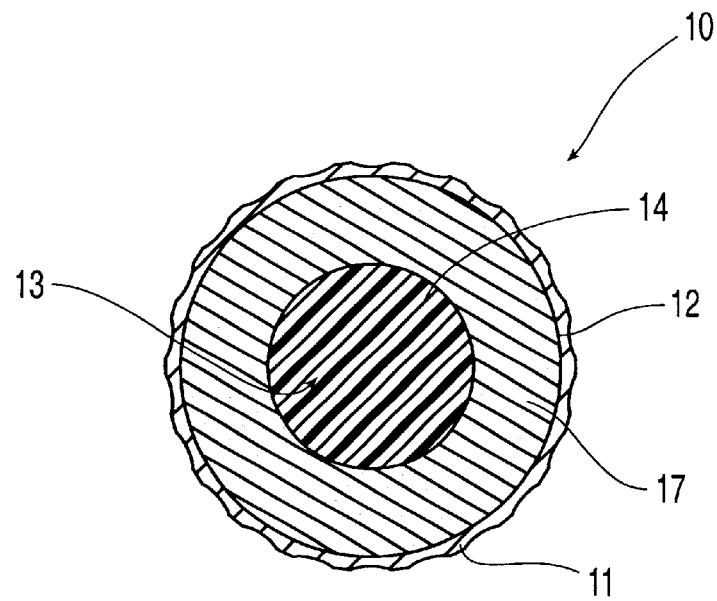
FIG. 1 is a sectional view of a completely soled ball according to the present invention.
Figure 7:
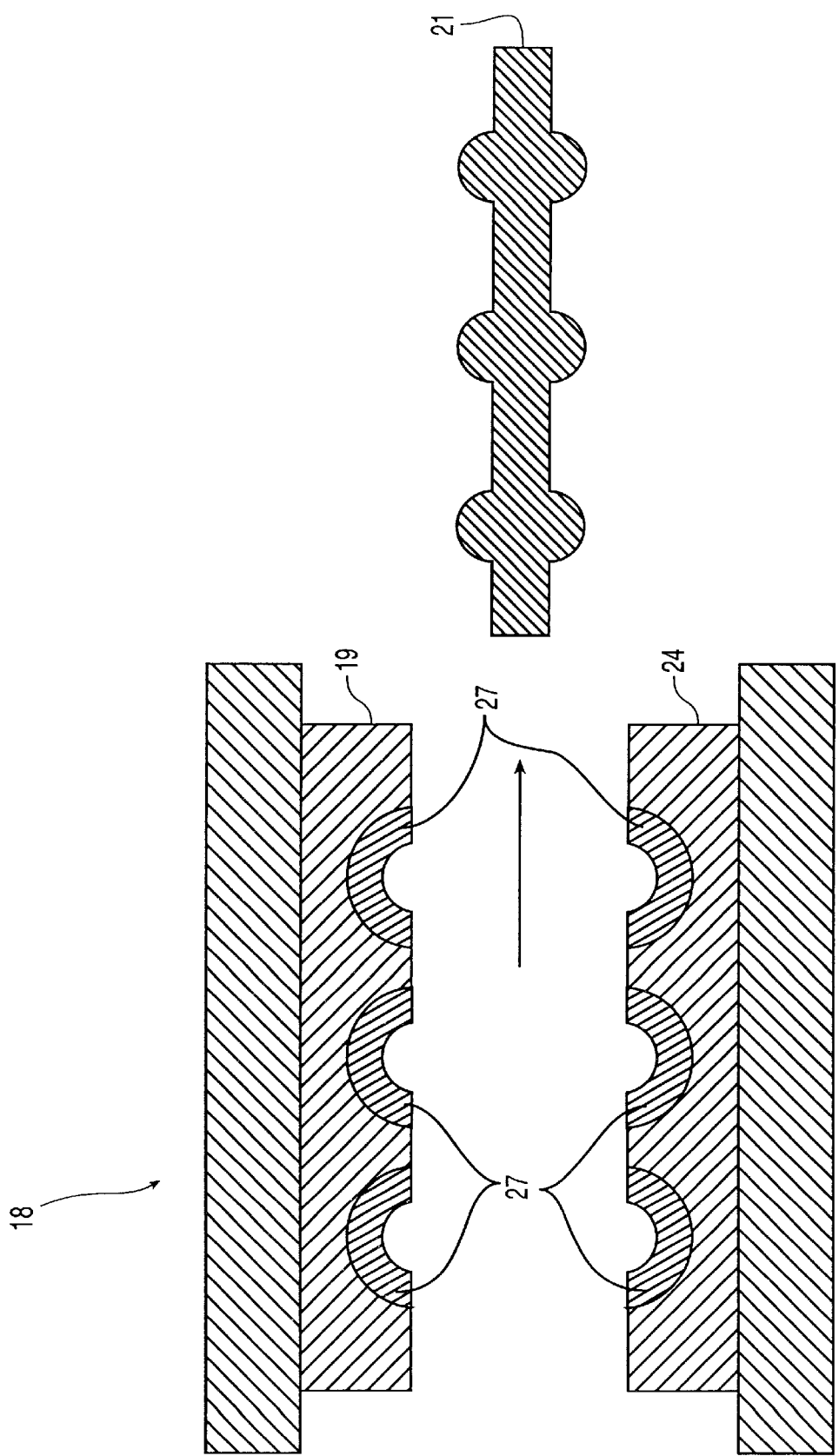
FIG. 7 illustrates the shells after compressionl molding according to the present invention.

Turning to FIG. 1, a preferred embodiment of a golf ball 10 constructed in accordance with the present invention is shown comprising a cover 11 and a core 12. The core 12 has a center 13 that is disposed concentrically therein. The center 13 may comprise of a solid construction 14 or a fluid-filled construction 15 in a first layer 16, as shown FIG. 2. The core 12 further comprises an intermediate layer 17 formed around the center 13. Intermediate layer 17 is typically formed from two halves, or hemispherical cups 27 as shown in FIG. 7.

The cover 11 provides the interface between the ball 10 and a club and other objects such as trees, cart paths, and grass. Properties that are desirable for the cover 11 include moldability, high abrasion resistance, high tear strength, high resilience, and mold release. The cover 11 can be comprised of polymeric materials such as ionic copolymers of ethylene and an unsaturated monocarboxylic acid which are available under the trademark "SURLYN" of E.l. Dupont De Nemours & Company of Wilmington, Del. or "IOTEK" or "ESCOR" from Exxon. These are copolymers or terpolynrers of ethylene and methacrylic acid or acrylic acid partially neutralized with zinc, sodium. lithium, magnesium, potassium, calcium, manganese, nickel or the like. The cover 11 generally provides sufficient strength for good performance characteristics and durability. Preferably, the cover 11 is of a thickness between about 0.03 inches and about 0.12 inches. More preferably, the cover 11 is about 0.04 to 0.09 inches in thickness. Most preferably, the cover 11 ranges from about 0.05 to 0.085 inches in thickness. In one preferred embodiment, the cover 11 can be formed from mixtures or blends of zinc, lithium and/or sodium ionic copolymers or terpolymers. The Surlyn® resins uses in the cover 11 are ionic copolymners or terpolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This invention can likewise be used in conjunction with homopolymeric and copolymer materials such as:

(1) Vinyl resins such as those formed by the polymerization of vinyl chloride, or by the copolymerization of vinyl chloride with vinyl acetate, acrylic esters or vinylidene chloride.

(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst.

(3) Polyurethanes such as those prepared from polyols and diisocyanates or polyisocyanates and those disclosed in U.S. Pat. No. 5,334,673.

(4) Polyureas such as those disclosed in U.S. Pat. No. 5,484,870.

(5) Polyamides such as poly(hexamethylene adipamide) and others prepared from diamines and dibasic acids, as well as those from amino acids such as poly (caprolactam), and blends of polyamides with Surlyn, polyethylene, ethylene copolymers, ethyl-propylene-non-conjugated diene terpolymer, etc.

(6) Acrylic resins and blends of these resins with poly vinyl chloride, elastomers, etc.

(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly (etheramide), such as PEBAX sold by ELF Atochem.

(8) Polyphenylene oxide resins, or blends of polyphenylene oxide with high impact polystyrene as sold under the trademark "Noryl" by General Electric Company, Pittsfield, Mass.

(9) Thermoplastic polyesters, such as polyethylene terephthalate. polybutylene terephthalate, polyethylene terephthalate/glycol modified and elastomers sold under the trademarks "Hytrel" by E.I. DuPont De Nemours & Company of Wilmington, Del. and "Lomod" by General Electric Company, Pittsfield, Mass.

(10) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers. Blends of thermoplastic rubbers with polyethylene, propylene, polyacetal, nylon, polyesters, cellulose esters, etc.

Preferably, the cover 11 is comprised of polymers such as ethylene, propylene, butene-1 or hexane-1 based homopolymers and copolymers including functional monomers such as acrylic and methacrylic acid and fully or partially neutralized ionomer resins and their blends. methyl acrylatc methyl methacrylate homopolymers and copolymers, imidized, amino group containing polymers, polycarbonate, reinforced polyamides, polyphenylene oxide, high impact polystyrene, polyether ketone, polysulfone, poly(plhenylene sulfide), acrylonitrile-butadiene, acrylic-styrene-acrylonitrile, poly(ethylene terephthalate), poly(butylene terephthalate), poly(ethelyne vinyl alcohol), poly (tetrafluoroethylenie) and their copolymers including functional comonomers and blends thereof. Still further, the cover 11 is preferably comprised of a polyether or polyester thermoplastic urethane, a thermoset polyurethane, a low modulus ionomer such as acid containing ethylene copolymer ionomers, including E/X/Y terpolymers where E is ethylene, X is an acrylate or methacrylate-based softening comonomer present in 0–50 weight percent and Y is acrylic or methacrylic acid present in 5–35 weight percent. More preferably, in a low spin rate embodiment designed for maximum distance, the acrylic or methacrylic acid is present in 15–35 weight percent, making the ionomer a high modulus ionomer. In a high spin embodiment, the acid is present in 10–15 weigh percent or a blend of a low modulus ionomer with a standard ionomer is used.

The intermediate layer 17 of the core is preferably made of a thermoset rubber base materials, including those conventionally employed in golf ball cores. The conventional materials for such cores include compositions having a base rubber, a crosslinking agent, a filler and a co-crosslinking agent. The base rubber is typically a synthetic rubber like 1,4-polybutadiene having a cis-structure of at least 40%. Natural rubber, polyisoprene rubber and/or styrene-butadiene rubber may optionally be added to the 1,4-polybutadiene. The initiator included in the core composition can be any polymerization initiator which decomposes during the cure cycle. The crosslinking agent includes a metal salt of an unsaturated fatty acid such as sodium. zinc, lithium or magnesium salt or an unsaturated fatty acid having 3 to 8 carbon atoms such as acrylic or methacrylic acid. The filler typically includes materials such as zinc oxide, barium sulfate, silica, calcium carbonate, zinc carbonate, regrind and the like.

Alternatively, the intermediate layer 17 may comprise thermoplastic elastomers such as a thermoplastic polyesterester, thermoplastic polyesterester dynamically vulcanized thermoplastic elastomers, functionalized styrene-butadiene elastomers, thermoplastic urethanes or metallocene polymers or blends thereof.

Most preferably, the intermediate layer 17 is formed from a thermoset material, as set forth above. In forming the intermediate layer, the selected material is heated to a temperature that makes the material more pliable, but not to its cure activation temperature. Then, after the center 11 is inserted between ihe two hemispherical cups 27 of the intermediate layer 17, the material is heated to a second temperature that is greater than the cure activation temperature of the material, allowing the two shells 27 to fuse together as they cure. Alternatively, for a thermoplastic material, the hemispherical cups 27 are heated until they are pliable and then cooled. Thereafter, the center 11 is inserted between the hemispherical cups 27 and the assembly is heated to a second temperature, above the melting, temperature of the hemispherical cups 27, and thereafter cooled to solidify the thermoplastic material.

The intermediate layer 17 preferably has an outside diameter in the range of 80 to 98% of the finished ball diameter and an inner diameter in the range of 30 to 90% of the finished ball diameter. Preferably, the intermediate layer 17 has an inner diameter of approximately 0.5 to 1.51 inches and, more preferably, an inner diameter of approximately 0.75 to 1.4 inches. Preferably, the intermediate layer 17 has an inner diameter of approximately 0.9 to 1.25 inches. Yet further still, the first layer 16 has an outside diameter in the range of 1.3 to 1.65 inches and, more preferably, approximately 1.45 to 1.62 inches. Golf balls incorporating these measurements can be designed with the various attributes discussed below, such as specific gravity, resiliency and hardness, to provide the desired playing characteristics, such as spin rate and initial velocity.

Figure 3:
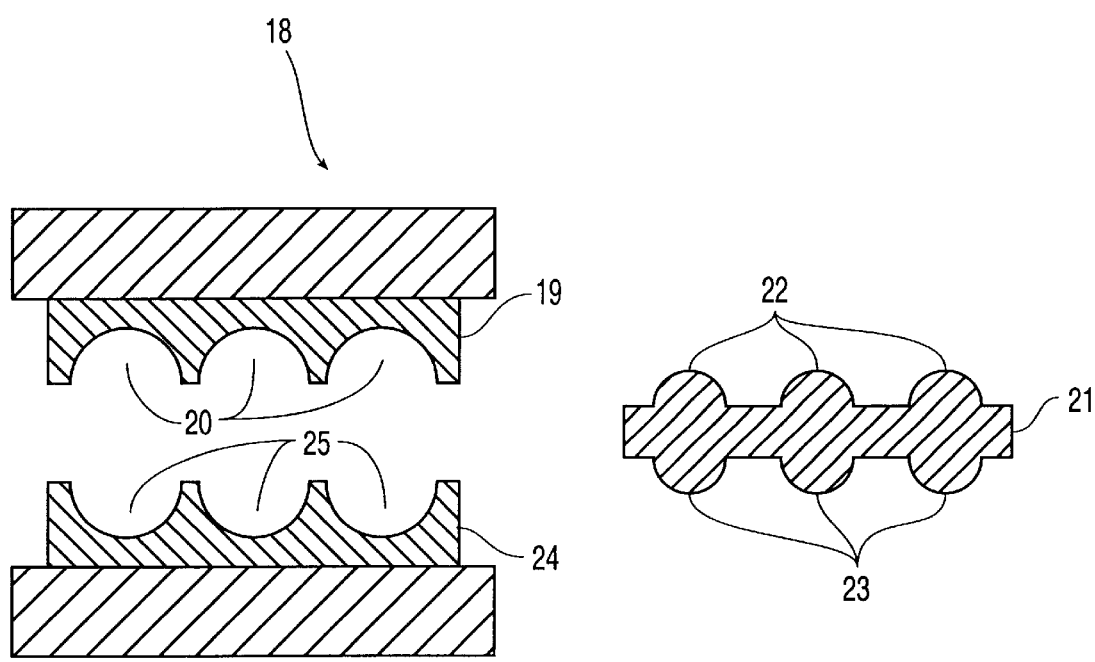
FIG. 3 is a sectional view of a press according to the present invention showing the top mold, center plate and bottom mold.

Referring now to FIG. 3, the golf ball cores 12 are formed in a three-mold press 18 having a top mold 19 with substantially hemispherical top cavities 20, a center plate 21, with top protrusions 22 and bottom protrusions 23, and a bottom mold 24 with substantially hemispherical bottom cavities 25. The hemispherical cavities 20 and 25 of top and bottom molds 19 and 24, respectively, are oriented toward each other and in alignment with the upper and lower protrusions 22 and 23 of the center plate 21. Such alignment gallows the top and bottom molds 18 and 19 to mate with the top and bottom protrusions 22 and 23 of the center plate.

Figure 4:
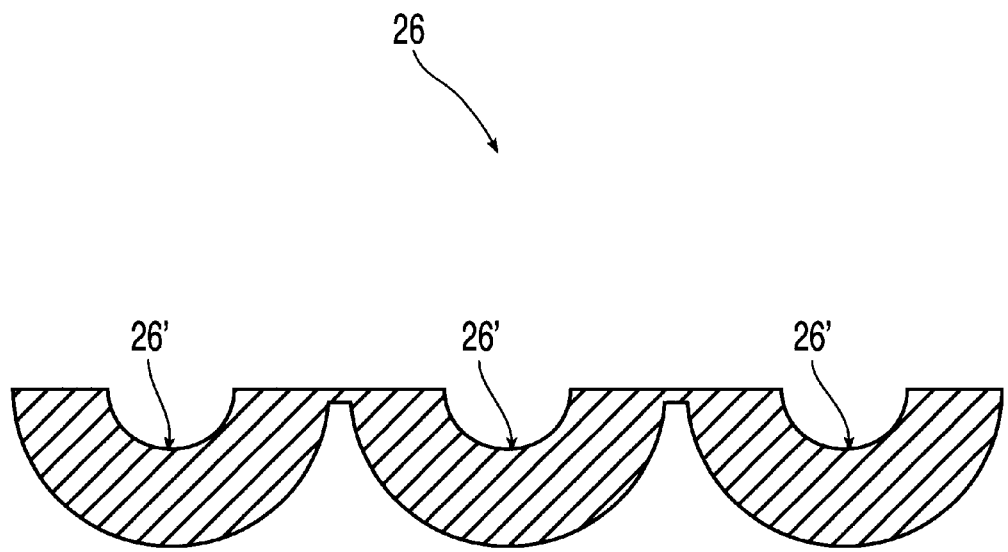
FIG. 4 is a section view of a shell having a substantially hemispherical cavity according to the present invention.
Figure 4A:
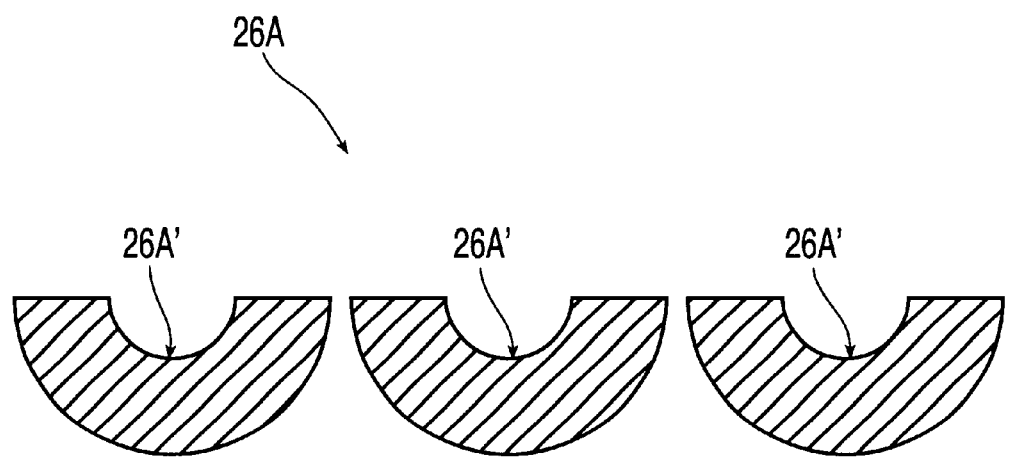
FIG. 4a is a sectional view of the shells shown as a group.
Figure 5:
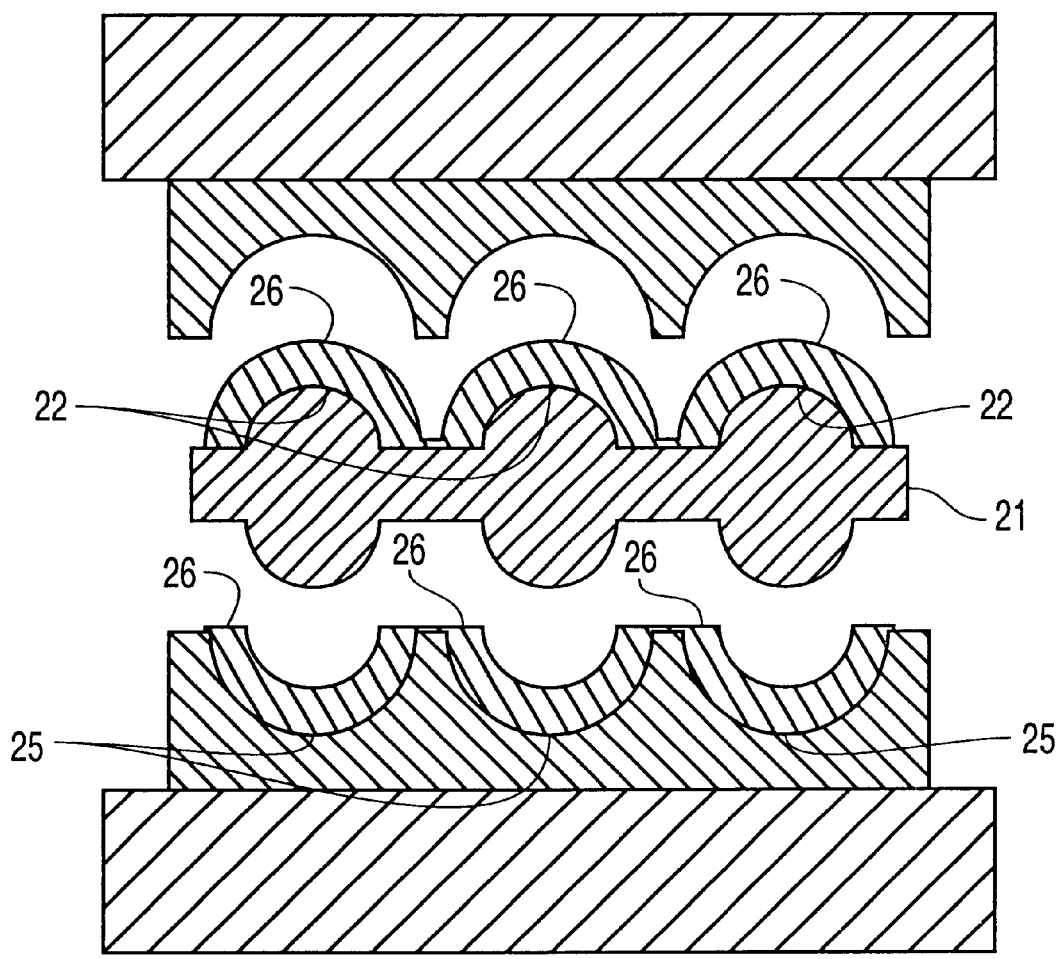
FIG. 5 illustrates the placement of the shells on the protrusions of the center plate and in the cavities of the bottom mold of the press prior to compression molding according to the present invention.
Figure 5A:
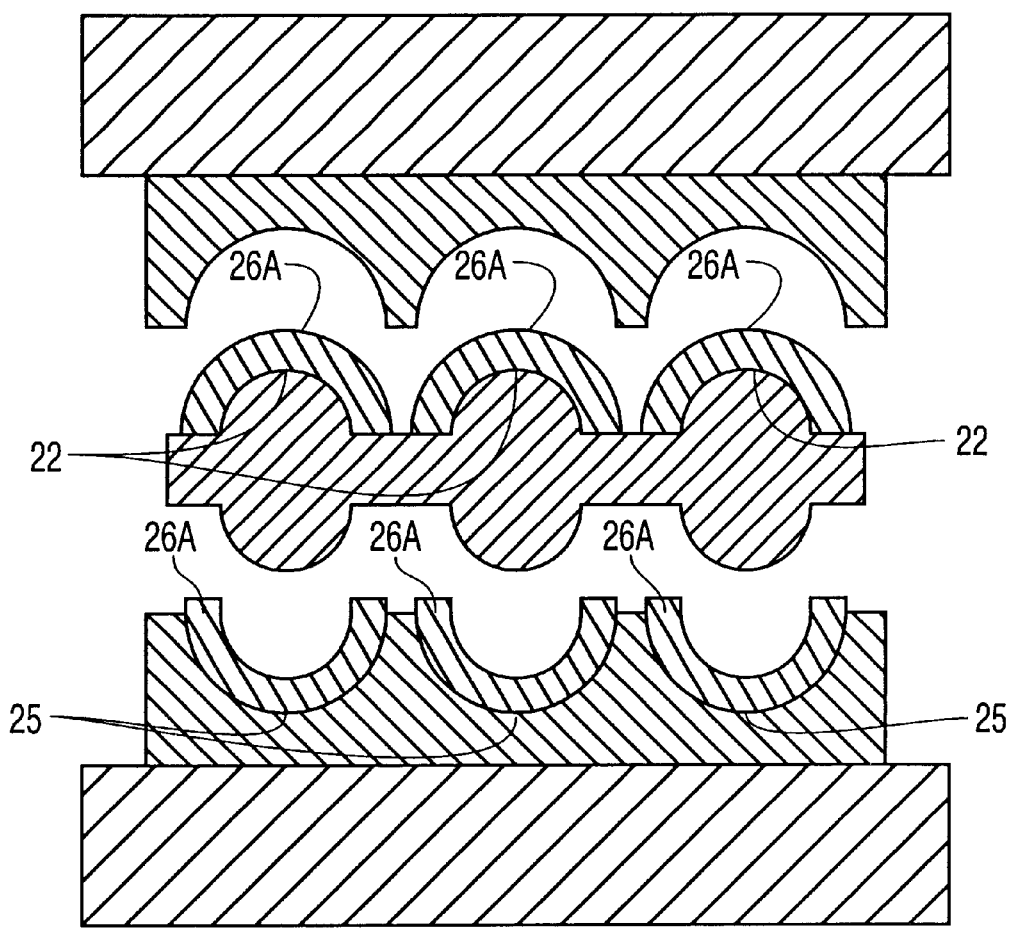
FIG. 5a illustrates the placement of individual shells in the molds of the press according to another embodiment of the present invention.
Figure 6:
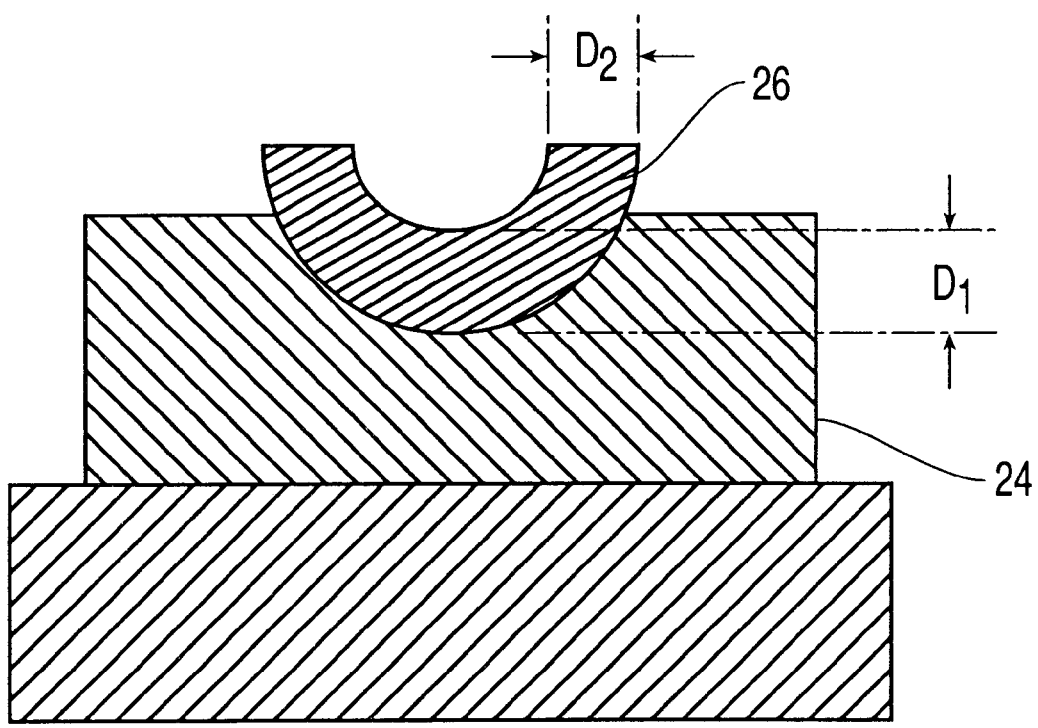
FIG. 6 details the placement of a shell prior to compression molding.

Referring to FIGS. 4–7, intermediate layer 17 comprises shells 26, which may be connected to each other (as shown in FIG. 4) or in the form of individual pieces (as shown in FIG. 4a) having hemispherical cavities 26' and 26' disposed in the mid-section, respectively. Shells 26, preferably of polybutadiene, are placed in the bottom cavities 25 of the bottom mold 24 and on the top protrusions 22 of the center plate 21 as shown in FIG. 5. In the preferred process, the shells 26 and the center 13 are pre-molded by placing prep material in a separate mold. The uncured shells 26 are designed with greater prep material in the vertical direction of the mid-section than that required for the desired final product as shown in FIG. 6. Preferably, the shells can have up to about 50% additional material than the desired final product.

After placing shells 26 in the lower cavities 25 of the lower mold 24 and the top protrusion 22 of the center plate 21, the press 18 is closed such that the hemispherical top and bottom protrusions 22 and 23 on each side of the center plate 21 are inserted between and aligned with the upper and lower mold cavities 20 and 25. The press 18 is then heated to a first temperature below the initialization temperature of the shells 26 to form non-vulcanized hemispherical cups 27.

Figure 8:
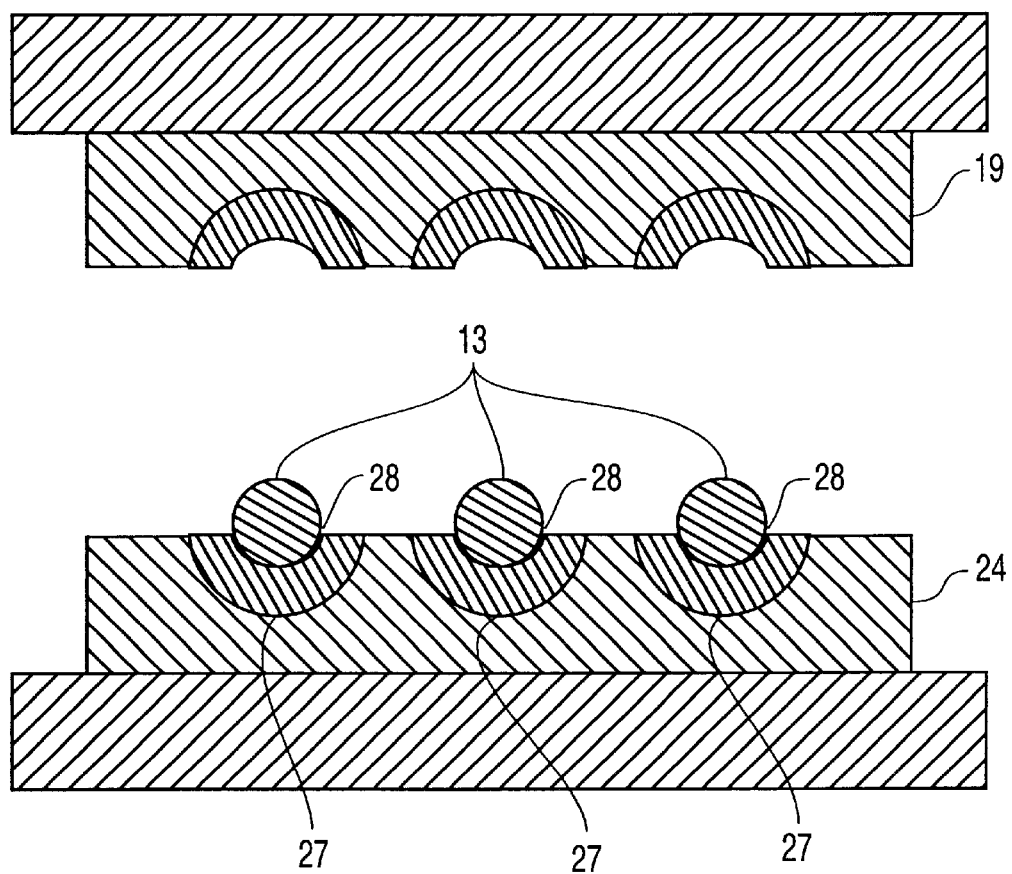
FIG. 8 illustrates placing the pre-molded center within the cavities of the shells in the bottom mold of the press according to the present invention.

At this point in the process, the center plate 21 is removed, as shown in FIG. 7. The non-vulcanized hemispherical cups 27 are substantially molded to hemispherical cavities 20 and 25 of the top and bottom cavities 20 and 25 and secured therein. A pre-molded center 13 is then placed in each lower cavity 28 of the hemispherical cups 27 in the bottom mold 25, as illustrated in FIG. 8. Hemispherical cups 27 are preferably kept in their respective hemispherical molds 19 and 24 during this step. The press 18 is thereafter closed and preferably heated to an elevated temperature sufficient to cause crosslinking between the elastomeric shell material of each hemispherical cup 27, joining the two hemispherical cups 27 located in the mating cavities 20 and 25 of the top and bottom molds 19 and 24. Upon completion of this step of the process, the hemispherical cups 27 are formed about the center 13 completing the multilayer core 12. Processing the intermediate layer 17 in multiple steps, according to the present invention, prevents unwanted deformation of the center 13 by the intermediate layer 17 when a soft center is placed within cavities of the hemispherical cups 27 cavities since the method does not depend on the rigidity of the center in shaping of the shells.

Figure 2:
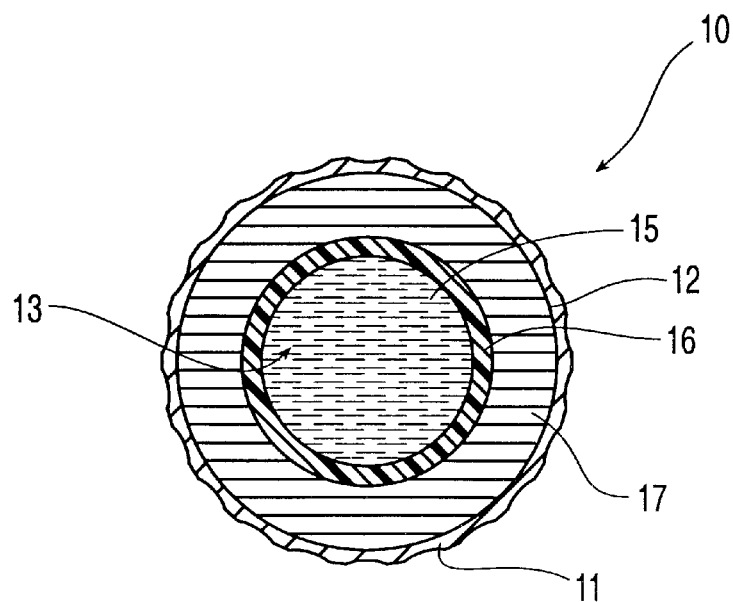
FIG. 2 is a sectional view of a liquid filled ball according to another embodiment of the present invention.
Figure 9:
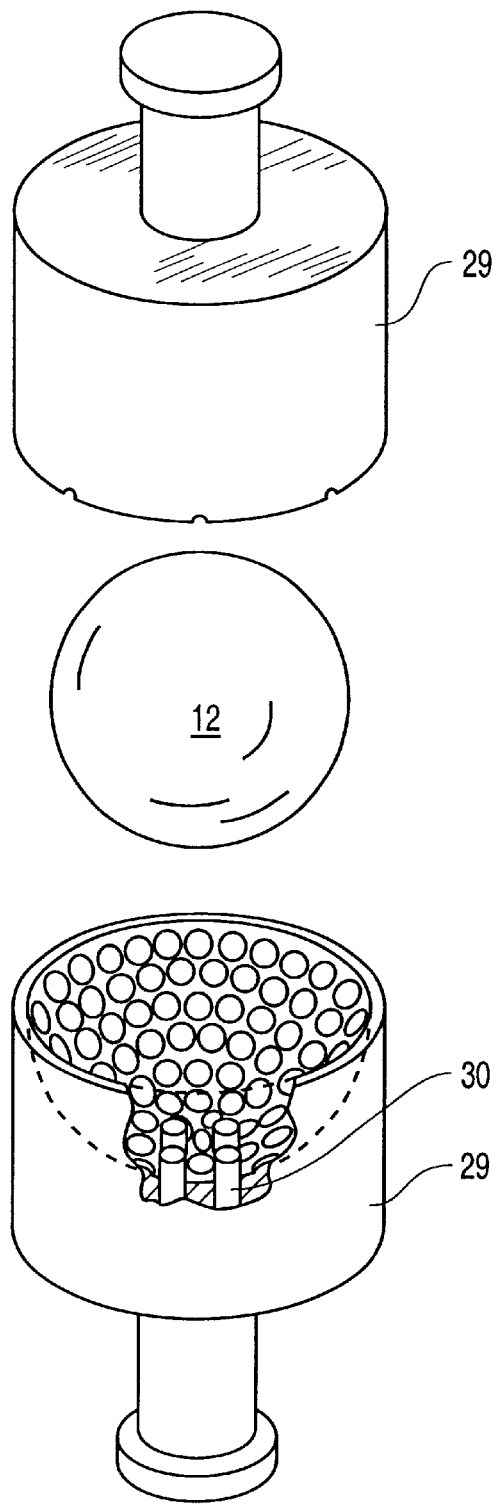
FIG. 9 shows an injection mold forming a cover around a core.
Figure 10:
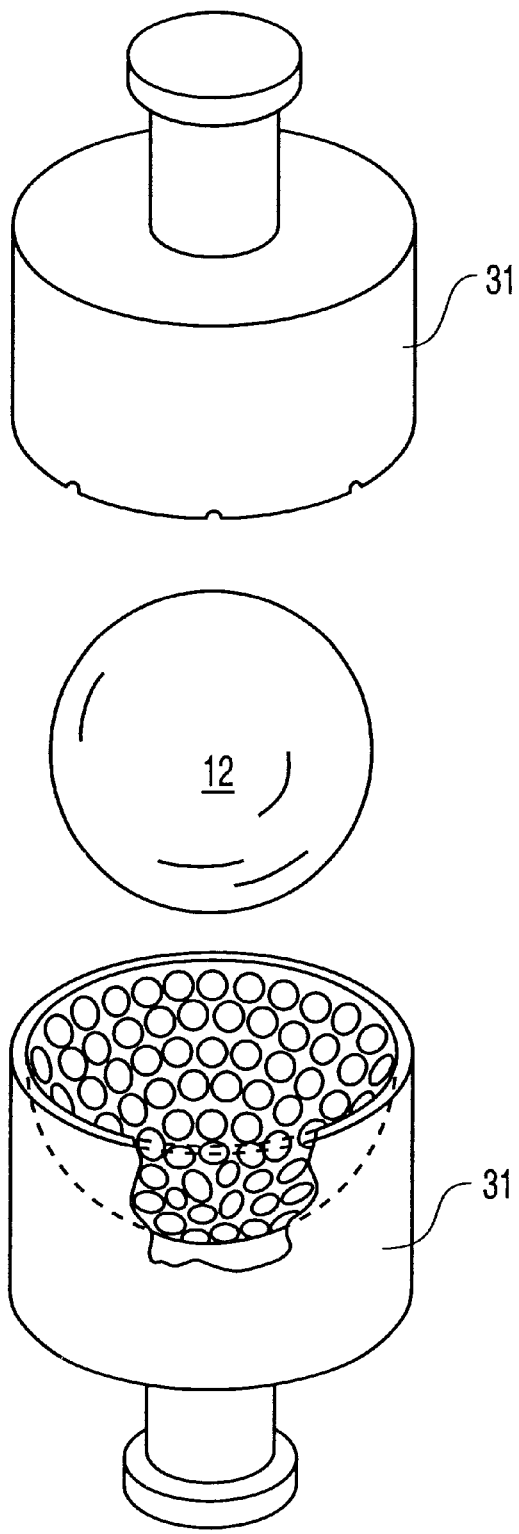
FIG. 10 shows a compression mold forming a cover around a core.

The cover 11 is then formed around the core 12 as seen in FIGS. 1 and 2. FIG. 9 shows injection molding of the cover 11 around the core 12 in a dimpled mold 29 with retractable pins 30. The pins 30 position the core 12 dimpled mold 29 and are retracted before the cover 11 fills and cools completely. Alternatively, cover 11 may be compression molded over the core 12. FIG. 10 illustrates compression molding two halves of a cover 11 around the core 12 in a dimpled mold 31.

Figure 11:
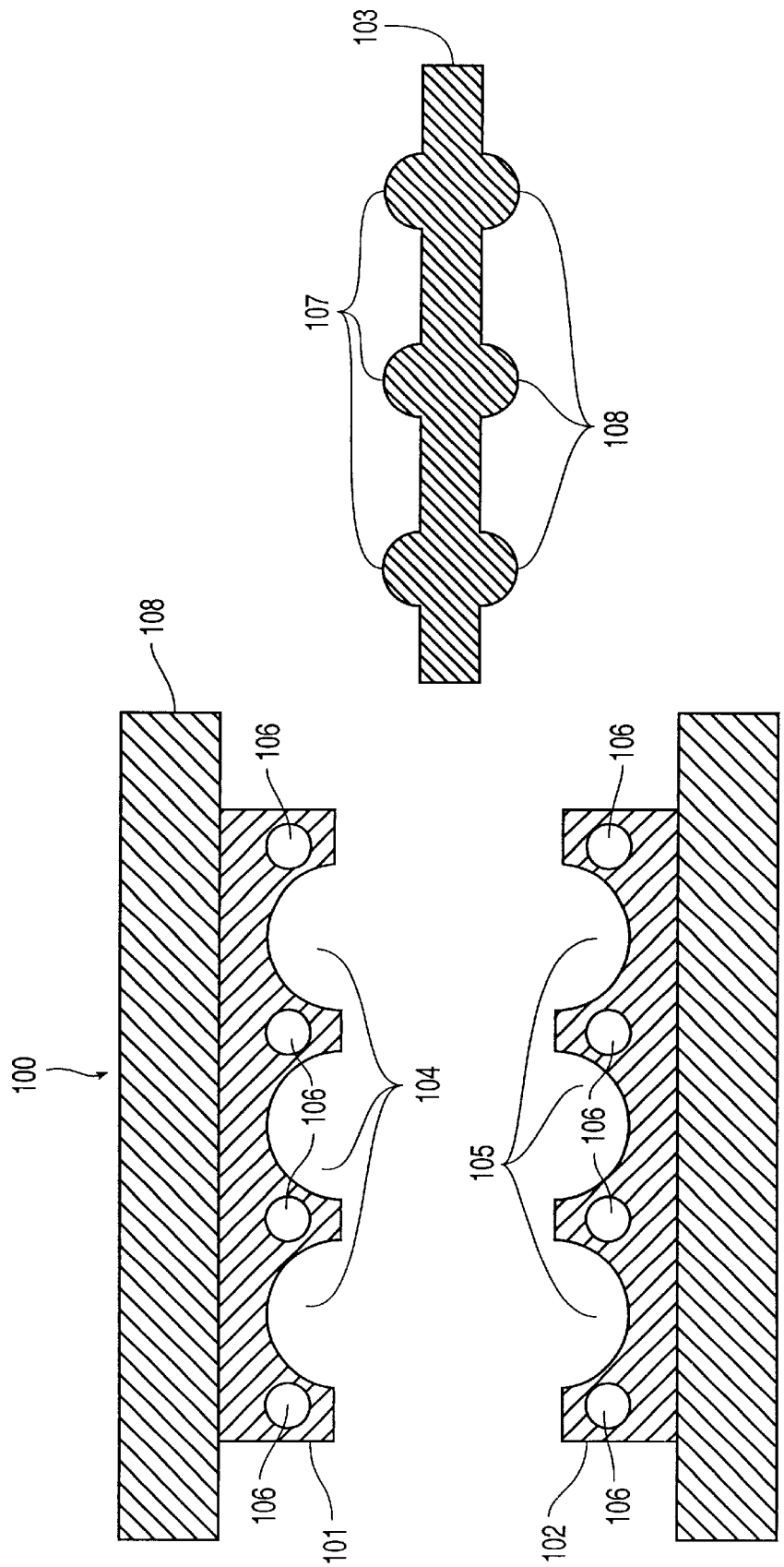
FIG. 11 is a sectional view of the top, center and bottom molds of the press according to another embodiment of the present invention.

The present invention also includes an improved press construction for forming the golf ball core having an outer layer or shell. Deferring to FIG. 11, press 100 comprises a top mold 101, a bottom mold 102 and a cente plate 103. The top and bottom molds 101 and 102 include a plurality of top and bottom mating cavities 104 and 105, respectively. that form a sphere the size of a golf ball core 12 as set forth above. Flow channels 106 are disposed within the top and bottom molds 101 and 102 of the press 100. Flow channels 106 may be utilized as cooling or heating water channels.

The center plate 103 includes a plurality of top and bottom protrusions 107 and 108 disposed on opposite sides of the center plate 103, corresponding to the cavities 104 and 105 of the top and bottom molds 101 and 102. The protrusions 107 and 108 are hemispheres that are substantially the same size as ½ of the ball center 13 as set forth above. The center plate 103 may utilize chilled or process water and have inlet and outlet points. The lower and upper molds 101 and 102 are secured to the frame of the press 100, and the center plate 103 is slidably secured to the frame 108 of the press 100 such that the center plate 103 can be easily moved in and out of the press 100. Preferably, the center plate 103 is secured to the back of the press 100. In this manner, the press 100 can be operated without removing the molds 101, 102 and 1103 minimizing time consuming handling of the molds.

Figure 12:
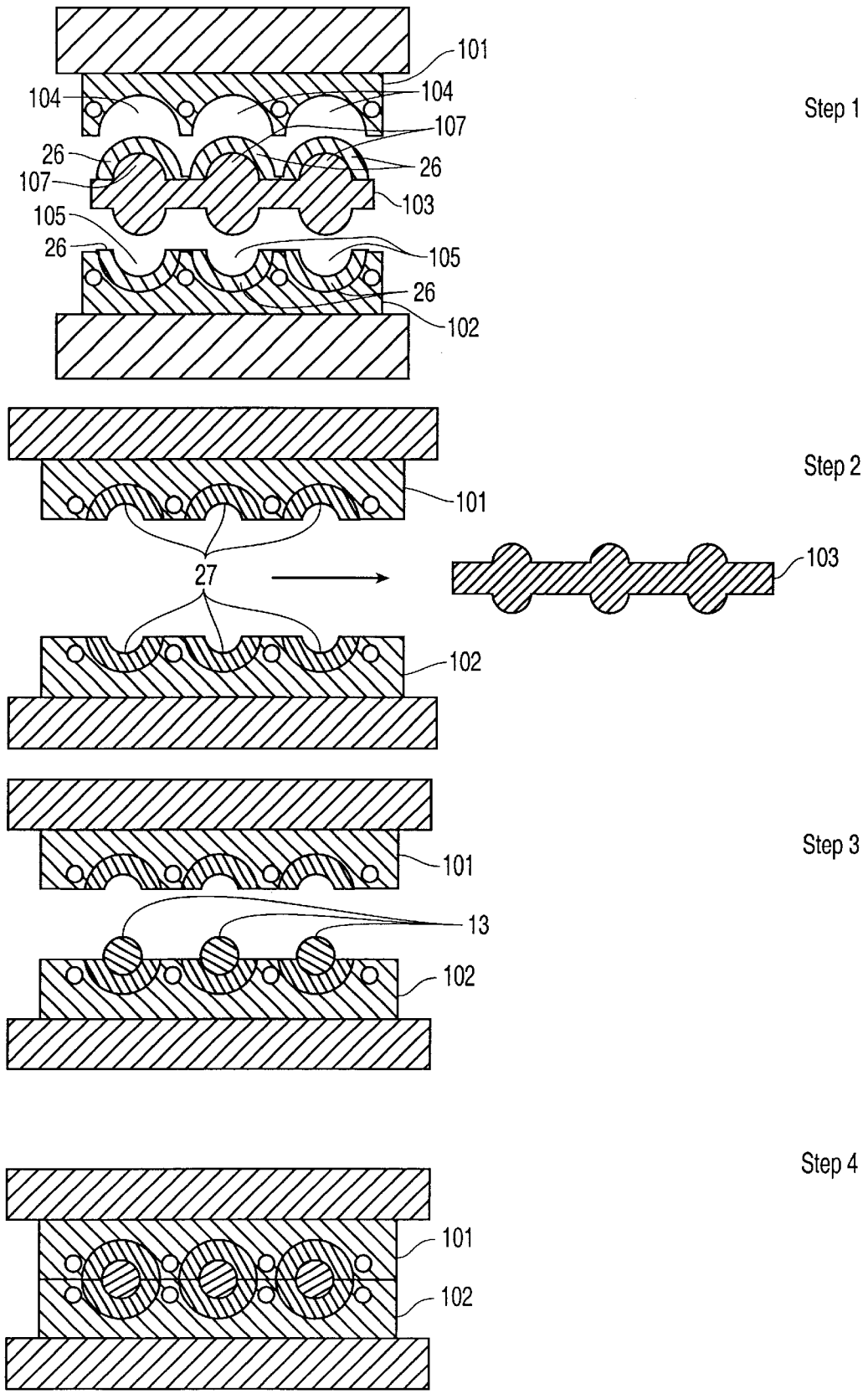
FIG. 12 is a flow chart illustrating the method of forming golf ball cores according to the present invention.

Referring now to Step 1 of FIG. 12, the shells 26, preferably of polybutadiene, are placed in the cavities 105 of the bottom mold 102 and the top protrusion 107 of the center portion mold 103. The center plate 103 and the bottom mold 102 are thereafter moved between and in alignment with the top mold 101 such that the protrusions 107 and 108 and the cavities 104 and 105 and are all in alignment.

Once the press 100 is in position, the press 100 is closed and heated. Preferably the molds 101 and 102 are heated to a first temperature, making the polybutadienie shells 26 significantly more pliable, but below the cure initiation temperature. Preferably, the temperature is greater than about 150° F. but less that the cure initiation point. The most preferred temperature is between about 190° and 220° F. The press 100 is closed with a pressure sufficient enough to form hemispherical cups 27 from the polybutadiene shells 26 as shown in Step 2. Preferably the molds 101 and 102 are compressed to a pressure of about 700 to 1400 psi and mole preferably, it is compressed to a pressure of about 1000 psi. The temperature of the molds 101 and 102 are then cooled to a temperature so that the material retains its shape, preferably about 60 to 100° F. More preferably, the molds 101 and 102 is cooled to less than about 80° F. Preferably, the center plate 103 has a higher temperature than the top and bottom molds 101 and 102 before opening the press 100 for retaining the now formed hemispherical cups 27 in the upper and lower cavities 104 and 105.

After forming the hemispherical cups 27, the center plate 103 is removed from the press 100. Then turning to Step 3, the centers 13 air placed within the cavities 28 located in the hemispherical cups 27 of the bottom mold 102. The top mold 101 is moved into alignment with the bottom mold 102 such that the hemispherical cups 27 form a sphere around the ball centers 13. The press 100 is closed, heated and compressed again, as shown in Step 4. At this stage, the top and bottom molds 101 and 102 are heated to a temperature above the cure initiation of the hemispherical cups 27. Preferably, the press 100 is heated to a temperature of greater than about 290° F. and is compressed a pressure of greater than about 2000 psi. The molds 101, 102, and 103 preferably are constructed with materials and dimensions to improve the thermal conductivity of the press.

While it is apparent that the illustrative embodiments of the invention herein disclosed fulfill the objectives stated above, it will be appreciated that numerous modifications and other embodiments may be devised by those skilled in the art, for example, a series of progressively larger diameter shells can be formed and joined by the methods disclosed. Therefore, it will be understood that the appended claims are intended to cover all such modifications and embodiments which come within the spirit and scope of the present invention.

What is claimed is:

1. A method for manufacturing a golf ball comprising:
   a) forming a pre-molded center;
   b) providing a press with a top mold, a slidable center plate, and a bottom mold;
   c) placing pre-molded hemispherical shells into the bottom mold and on top of the center plate;
   d) sliding the center plate between the top and bottom molds;
   e) closing the press with the top and bottom molds and the center plate that are in substantial alignment with respect to each other;
   f) heating the press to a first temperature below the shells' crosslinking temperature such that the shells are pliable and form substantially hemispherical cups;
   g) retaining the hemispherical cups within the hemispherical cavities of the top and bottom molds by cooling the top and bottom molds while allowing the center plate to remain at a higher temperature than the temperature of the top and bottom molds after said cooling, opening the press, and removing the center plate;
   h) placing the pre-molded center within the henispherical cups;
   i) closing the press with the top and bottom molds to join the hemispherical cups around the pre-molded center to form a golf ball core; and
   j) forming a cover over the golf ball core.

2. The method of claim 1, wherein the step of closing the press with the top and bottom molds to join the hemispherical cups around the pre-molded center to form a golf ball core further comprises heating the molds to cause crosslinking between the cups and thereafter cooling the molds to cause thermal contraction of the cups.

3. The method of claim 1, wherein the step of providing a press further comprises providing flow channels in the top and bottom molds and the center plate for cooling or heating the top and bottom molds and the center plate.

4. The method of claim 1, wherein the step of closing the press with the top and bottom molds to join the hemispherical cups around the pre-molded center to form a golf ball core further comprises adhesively attaching the cups to each other.

5. A method of making a golf ball, comprising:
   a) forming a pre-molded center;
   b) providing a bottom mold having a plurality of cavities, a top mold having a plurality of corresponding cavities and a center plate having a plurality of corresponding top and bottom protrusions;
   c) forming a plurality of substantially hemispherical cups from elastomeric material by:
      i) placing elastomeric material in the cavities of the bottom mold and on the top protrusions of the center plate;
      ii) lociting the center plate between the top and bottom molds; and
      iii) compressing the elastomeric materials to form hemispherical cups in the bottom and top mold frame cavities;
   d) removing the center plate from between the top and bottom molds;
   e) placing the pre-molded centers in the hemispherical cups in the bottom mold;
   f) locating the top mold over the bottom mold;
   g) joining the hemispherical cups around the pre-molded centers to form a substantially spherical core; and
   h) molding a cover around the core.

6. The method of claim 5, wherein the step of closing the press further comprises elevating the temperature of the elastomeric material to a second temperature above the cure activation temperature.

7. The method of claim 6, wherein the step of joining the hemispherical cups further comprises cooling the elastomeric material to induce thermal contraction of the elastomeric material to facilitate removal from the molds.

8. A method of claim 7, wherein the step providing a press further comprises providing flow channels in the top and bottom molds and the center plate.

* * * * *